Sept. 24, 1968   W. S. WRIGHT, JR., ETAL   3,402,899
SAFETY HARNESS DEVICE
Filed March 8, 1967                              2 Sheets-Sheet 1
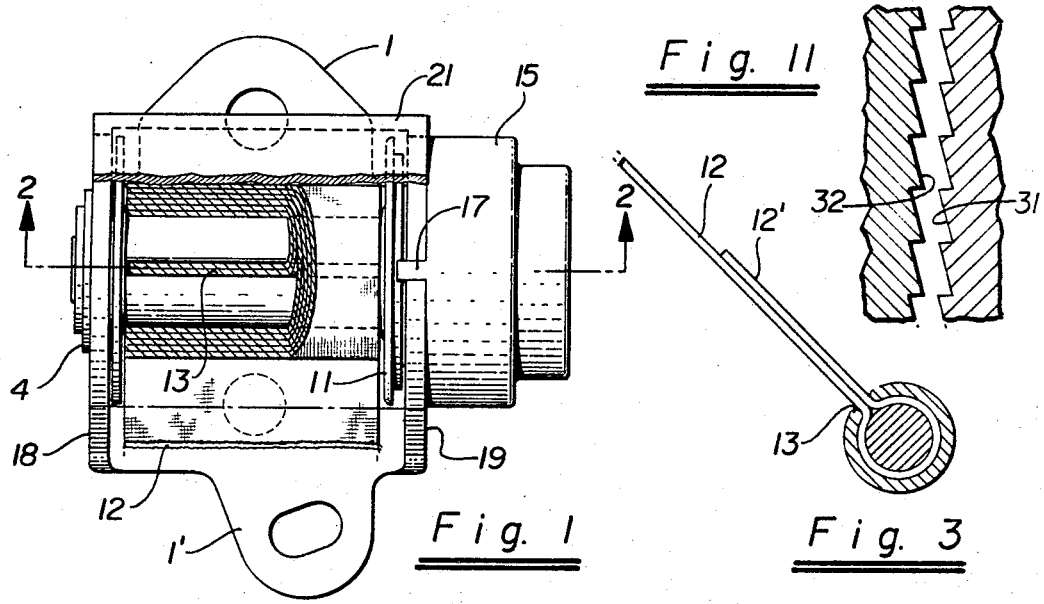
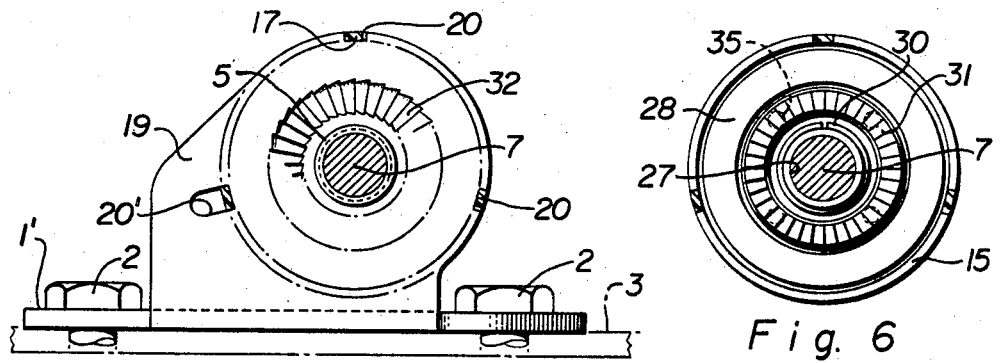
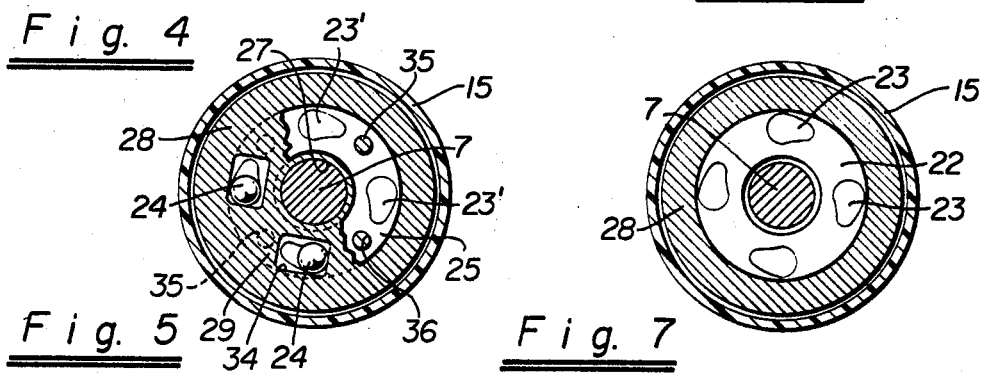
INVENTORS
William S. Wright, Jr.
Albert W. Francis
Paul B. Hunter
Attorney Sept. 24, 1968  W. S. WRIGHT, JR., ETAL  3,402,899
SAFETY HARNESS DEVICE
Filed March 8, 1967  2 Sheets-Sheet 2
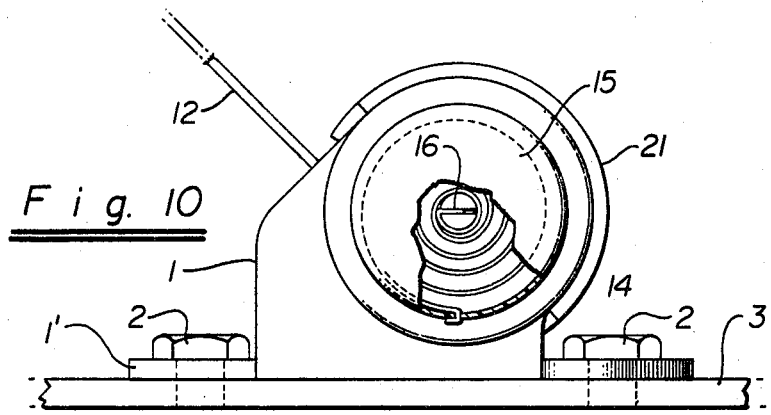
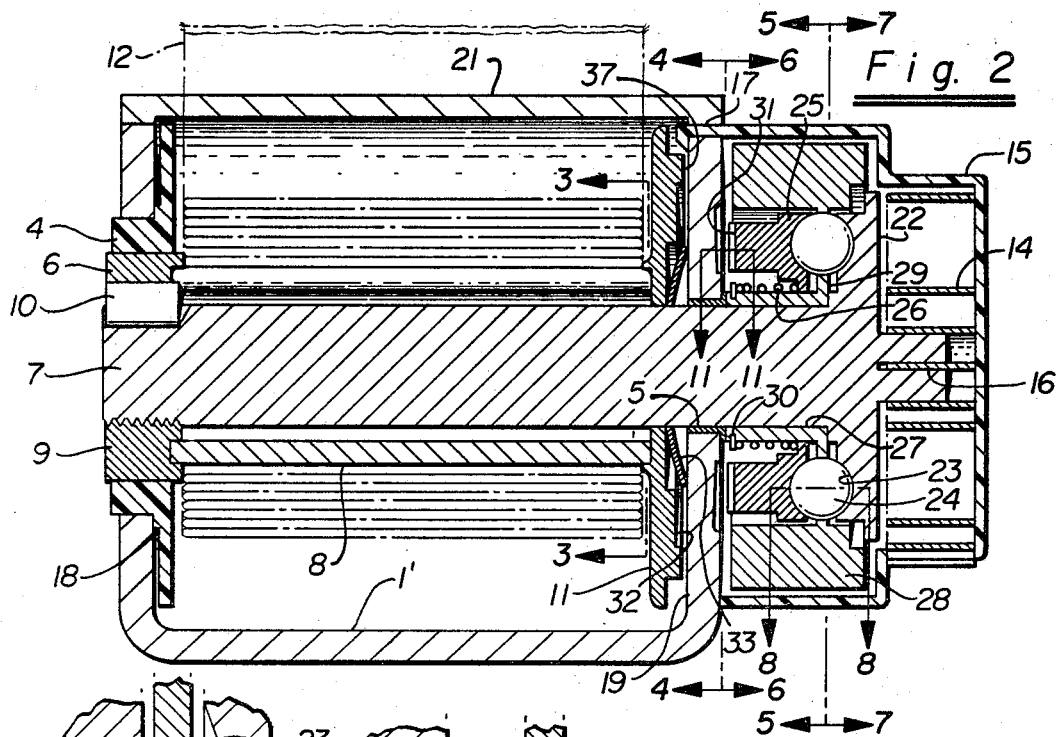
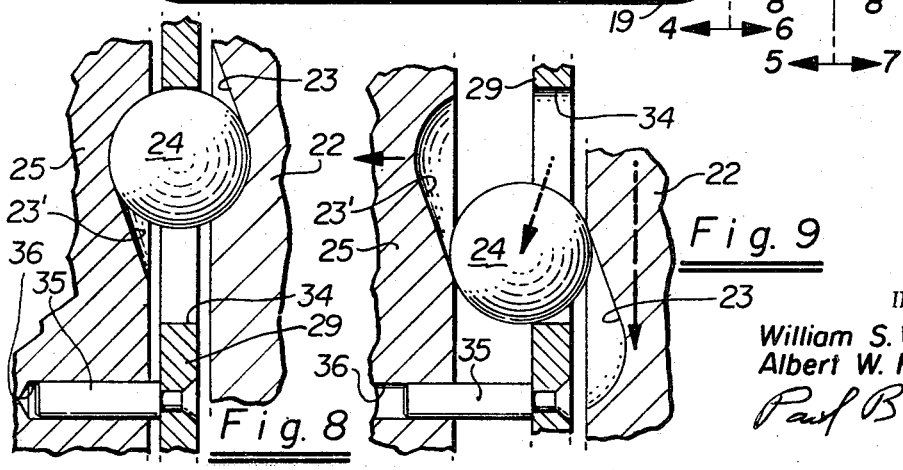
INVENTORS
William S. Wright, Jr.
Albert W. Francis
Paul B. Hunter
Attorney United States Patent Office 3,402,899
Patented Sept. 24, 1968

3,402,899
SAFETY HARNESS DEVICE
William S. Wright, Jr., Orange, Calif., and Albert William Francis, Farmington, Mich., assignors to Pacific Scientific Company, Commerce, Calif., a corporation of California
Filed Mar. 8, 1967, Ser. No. 621,572
3 Claims. (Cl. 242—107.4)

ABSTRACT OF THE DISCLOSURE

A safety harness device to limit outward movement of a strap from a winding spindle by acceleration responsive means wherein a clutch member and a spindle flange having opposed tapered sockets therein and ball means within the sockets, and an inertia member are mounted exteriorly of a U-shaped frame. Locking of the spindle is effected by binding the clutch member against friction means on the exterior of a frame end wall.

---

This invention relates generally to safety harness devices used on automotive vehicles, aircraft, etc., for protecting personnel against injury, and the invention has reference, more particularly, to a novel inertia responsive reel structure actuated by the user's harness strap for automatically retaining the user in his seat during crashes, sudden vehicles decelerations, and the like.

Safety harness devices of the general type herein involved have been developed over the years for use on aircraft, road and rail vehicles, etc. These devices generally combine a casing containing a spindle-supported reel mounted to turn and having a strap automatically wound thereon and unwound therefrom in response to movements of the user, such reel normally driving a spring-loaded inertia member and co-operating locking means acting to lock the reel against rotation in case the strap, and hence the user, moves with respect to his seat at an excessive and dangerous acceleration.

In use, it has generally been necessary to mount these devices on the back of the seat of the user or in the vehicle in a position such that the spindle-supported reel is substantially horizontal in order to cause the device to operate uniformly at a desired set acceleration rate. Should the casing of the device be up-ended or inclined so that the reel is not horizontal, the effective weight of the spring-loaded inertia member varies so that the device will operate at a different acceleration from that set and hence becomes unreliable in use, and that is particularly objectionable in slower moving vehicles, helicopter, etc., where the G setting of the device is generally lower than that in most aircraft.

Co-pending patent application Serial No. 529,080 filed February 21, 1966, now Patent No. 3,335,974, in which William S. Wright, Jr., one of the inventors herein, is the applicant, discloses a safety harness device of such sensitivity that the same is especially useful on road vehicles and other slower moving vehicles such as helicopters wherein the G setting of the device may be appreciably lower than that used in most aircraft. This ability to operate reliably on a low G setting was due in part to a novel construction wherein the gripping means was made separate from the inertia mass and the weight of the inertia mass was so supported that it did not vary the G setting of the device regardless of the positioning of the device in the vehicle, whereas prior art devices did not have a reliable G setting when positioned on-end, for example.

The principal object of the present invention is to provide a novel safety harness device having the advantages of the device of said co-pending application while being of exceptionally rugged, simpler and less expensive construction.

A novel feature of the present invention is to provide a safety harness device having a progressive gripping action, the said device upon locking initially gripping the outer surface of one end of the casing of said device and then, if tne load becomes larger, causing gripping of the inner surface of such end, whereby axial distorting loads on the casing end wall or walls are greatly reduced while enabling the use of looser tolerances in the manufacture of such devices.

Another feature of the present invention is to provide a novel safety harness device of the above character wherein the clutch member for gripping the outer surface of the casing end wall is restrained against turning with respect to the inertia member to thereby insure a fast positive gripping action in use.

These and other features and advantages of the present invention will become more apparent after a perusal of the following specification taken in sonnehtion with the accompanying drawings wherein:

FIG. 1 is a plan view with parts broken away of the novel safety harness device of this invention;

FIG. 2 is an enlarged sectional view taken along the line 2—2 of FIG. 1;

FIG. 3 is a fragmentary sectional view taken substantially along line 3—3 of FIG. 2, looking in the direction of the arrows;

FIG. 4 is a reduced part sectional view with parts broken away or omitted, taken along the line 4—4 of FIG. 2, looking in the direction of the arrows;

FIG. 5 is a reduced sectional view taken along the line 5—5 of FIG. 2, looking in the direction of the arrows;

FIG. 6 is a reduced sectional view taken along the line 6—6 of FIG. 2, looking in the direction of the arrows;

FIG. 7 is a reduced sectional view taken along the line 7—7 of FIG. 2, looking in the direction of the arrows;

FIG. 8 is an enlarged fragmentary sectional view taken along the line 8—8 of FIG. 2, looking in the direction of the arrows;

FIG. 9 is a view similar to FIG. 8, but shows the parts in gripping relation;

FIG. 10 is an end view of the structure shown in FIG. 1 with parts broken away; and FIG. 11 is an enlarged fragmentary sectional view taken along the line 11—11 of FIG. 2, looking in the direction of the arrows.

Similar characters of reference are used in the above figures to designate corresponding parts.

Referring now to the drawings, the reference numeral 1 designates the frame or frame member of the reel portion of the safety device, which is shown as of substantial U-shape, having a base 1' that is adapted to be secured as by fasteners 2 to a suitable support 3, such as the back of the user's seat, the floor or ceiling of the vehicle, or perhaps the door jamb as where the device is used in a land vehicle such as an automobile. The upstanding legs or end walls 18 and 19 of the frame member 1 are provided with aligned apertures in which are fixed a flange bearing 4 and a bearing 5 respectively for rotatably supporting a reel 6 consisting of a spindle 7 and a surrounding spool 8. The spindle 7 is supported near one end portion thereof in the bearing 5, whereas the spool 8 which surrounds spindle 7 in somewhat spaced relation is supported at one end by a nut 9 that is threaded on an end portion of the spindle 7 and is supported in turn around its periphery by the flange bearing 4, nut 9 being fixed upon spindle 7 as by a lock pin 10. The other end of the spool 8 is provided with an annular flange 11 fixed thereon and supported upon the spindle 7 and turning therewith in use.

The flange 11 and flange bearing 4 serve as end guides for a shoulder strap 12 that is insertable through a longitudinal slot 13 provided in the spool 8 and wrapped around the spindle 7, as especially shown in FIGS. 1 to 3. The inner free end portion 12' of the strap may be sewed or otherwise adhered to the main portion of the strap 12. The strap 12 wraps around the spool 8 as especially shown in FIG. 2 and extends outwardly of the casing for attachment to the user's shoulder harness. A portion of the strap 12 is normally maintained in wrapped condition about the spool 8 by means of a spiral spring 14 that has its outer end fixed to the inner wall of a spring cup 15 and its inner end fitted into a slot 16 provided in the reduced end portion of spindle 7. The spring 14 tends to wind the strap 12 upon the spool 8 by turning the reel 6, consisting of spindle 7 and spool 8, within bearings 4 and 5. The spring cup 15 surrounds one end portion of the spindle 7 and parts associated therewith and has mutually spaced lugs 17 provided with hooked ends which are adapted to be inserted through conforming openings 20 and 20' provided in the frame end wall or leg 19. A cover 21 of C-shape snaps over and surrounds a substantial portion of the frame member 1 but provides a space for the strap 12 to extend outwardly thereof.

The end portion of the spindle 7 removed from the nut 9 is provided with a radially extending annular flange 22 that is provided on its inner surface with a number of mutually spaced, annularly disposed, tapered ball sockets 23 (see especially FIGS. 2 and 7) within which sockets are disposed balls 24, the said balls being normally retained in the deep portions of the sockets 23 by means of a spring-pressed clutch ring member 25 which is also provided on its face adjoining the balls 24 with tapered co-operating sockets 23', as especially shown in FIGS. 2 and 5. Clutch ring member 25 is urged against the balls 24 by a coiled calibration spring 26 that surrounds the hub portion 27 of an inertia member or flywheel 28 having a radial web 29 interconnecting the hub portion 27 with the flywheel proper 28. A snap ring 30 fits within a circumferential groove in the flywheel hub portion 27 to engage one end of the compression calibration spring 26, the other end of this spring pressing against a radially inwardly directed flange provided on the clutch ring 25, whereby this clutch ring serves to normally retain the balls 24 in the deep portions of sockets 23 and 23'. The flywheel 28 is of relatively heavy material such as steel, whereas the clutch ring 25 is of preferably light material such as aluminum alloy, and the balls 24 can also be of light material for reasons to be further explained. The flywheel hub 27 is confined between a shoulder provided on the annular flange 22 of spindle 7 and the end of bearing 5, as especially shown in FIG. 2, so that in case the device should be turned at an angle or on end the weight of this flywheel is not carried by the calibration spring 26 but is carried either by the bearing 5 or by the shoulder portion of spindle 7 in addition to being supported by the spindle 7 itself. Thus, it will be noted that the flywheel does not have any longitudinal movement along the spindle 7, but is free to turn thereon.

The inner end portion of the clutch ring 25 is serrated at 31 for co-operating with serrations 32 provided on the frame leg 19, as shown in FIGS. 2, 4 and 6. Normally, the serrations 31 and 32 do not engage so that the spindle 7 and its spool 8 are free to turn within the bearings 4 and 5. A cup spring 33 is positioned within a recess provided in the end flange 11 of spool 8 and bears against this flange and against the inner surface of end wall or frame leg 19 so as to urge the spool-spindle or reel assembly towards the left as viewed in FIG. 2 so that the hub of flywheel 28 is held against bearing 5 which in turn is fixed within the end wall 19. The flywheel web 29 is provided with annularly disposed slots 34 for accommodating the balls 24 and for allowing these balls to have a certain amount of circular motion with respect to the axis of the flywheel (see FIGS. 5, 8 and 9). The web 29 also carries annularly disposed and mutually spaced pins 35 slidably projecting into conforming apertures 36 provided in the clutch ring 25 (as shown particularly in FIGS. 5, 8 and 9).

In use, as the user moves about in his seat, the strap 12 will unwind and rewind on the spool 8 to adjust to his movements. As the strap moves, it turns reel 6 (i.e. 7–8) and, since calibration spring 26 acting through clutch ring 25 retains the balls 24 in the deepest portions of their sockets 23 and 23', the flywheel 28, clutch ring 25 and calibration spring 26 also turn. In the event, however, that the user is subjected to an excessive acceleration, such as due to crashes and the like, the user will move the strap 12 outwardly of the frame member 1, the acceleration of the strap depending upon how rapidly the vehicle decelerates. The tension of calibration spring 26 determines the rate of acceleration at which the device will lock. The stiffer this spring, the higher the acceleration required. Assuming, for example, that the calibration spring 26 is set for the device to operate at 2 G's, then, when the strap 12 is pulled outwardly by the user at a rate of 2 G's, the inertia of flywheel 28 will act against the tension of spring 26 to cause the balls 24 to ride outwardly of the deep portions of their sockets toward the position shown in FIG. 9, thereby forcing the clutch ring 25 towards the left as viewed in FIG. 2 and causing the engagement of its teeth 31 with the co-operating teeth 32 in the end wall 19, thus preventing further turning movement of the reel, to thereby retain the user in his seat.

If the load on the strap is not excessive, the teeth 31, 32 are sufficient to hold the strap against further movement. However, in the event the tension on strap 12 increases greatly, the balls will ride further outwardly of their sockets 23 and 23' into the position shown in FIG. 9, thereby forcing the spindle 7 and its connected spool 8 bodily towards the right as viewed in FIG. 2 against the tension of cupped spring 33, causing an annular boss 37 on the end flange 11 to engage the inner surface of wall 19, the frictional engagement thus produced serving to lock spool 8 also against the inner surface of wall 19, thereby holding the reel against further turning. If desired, the surface of boss 37 opposing wall 19 can be serrated or supplied with frictional material so as to enhance the gripping action although this is not generally necessary since the boss 37 is at an appreciable radial distance from the spindle 7 and hence has a substantial moment arm.

Thus it will be seen that, when the reel is fully locked, the end wall 19 of the frame member 1 is engaged on both sides to lock the reel. The pressure of the clutch ring 25 and of the flange 11 against opposite sides of wall 19 prevents undesired endwise distortion of this wall which otherwise might take place should the wall be gripped upon one side only, and this is highly desirable since distortion of the frame member 1 tends to cause binding of the spindle and other objectionable results. Furthermore, since the gripping is all on the one wall 19, manufacturing tolerances can be made less severe than in the case where both end walls 18 and 19 are gripped as in the above-mentioned application to secure locking of the reel. The pins 35 on the flywheel web serve to prevent the relatively light clutch member 25 from moving with the balls 24 during the gripping operation so there is a positive gripping action by the rolling of the balls toward the shallower portions of sockets 23 and 23' during this operation, obtaining fast, positive stopping of the strap 12 during emergencies. Since the weight of the flywheel is not carried by spring 26 and since the balls 24 and clutch member 25 are relatively light, the calibration spring 26 is accurate in determining the number of G's at which the device will operate regardless of how this device is positioned within the vehicle.

The use of the elongated slots 34 in the flywheel web 29 permits balls 24 to have a relatively long travel with respect to the flywheel web 29 during a locking operation, thereby enabling the mass of the flywheel 28 to be considerably reduced over that used in the aforementioned application, Ser. No. 529,080, bearing in mind that the work done in compressing calibration spring 26 equals force times distance and by increasing the distance the force exerted by the flywheel is lessened. In that earlier application, the flywheel web closely captured the balls so that in going from the unlocked to the locked condition the spindle flange was displaced angularly relative the spindle only half as much as the clutch ring, and, since a predetermined amount of work is required to compress the calibration spring 26, and as this work must be supplied by the inertia of the flywheel lagging behind the shaft, a heavier flywheel must be used in said earlier application other things being equal.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A safety harness device comprising a substantially U-shaped frame member having a base provided with spaced end walls, a transversely extending spindle within said frame member rotatably supported in said end walls, a spool fixed upon said spindle and rotatable therewith, a strap wound on said spool, said strap extending outwardly of said frame member for connection to the body of the user, a rewind spring connected between said frame member and said spindle permitting unwinding of said strap and causing rewinding thereof during normal movements of the user in his seat, a clutch member surrounding one end portion of said spindle exteriorly of an end wall of said frame member, a flange fixed on said spindle end portion exteriorly of said clutch member, said clutch member and said flange having opposed tapered sockets, balls in said sockets, an inertia member having a rim portion surrounding said clutch member, said inertia member having a web extending inwardly between said flange and said clutch member, said web being provided with annularly elongated slots surrounding said balls for receiving the same while permitting a predetermined annular movement of said balls with respect to said inertia member in use, said inertia member having a hub portion turnably supported on said spindle, a calibrating spring carried by said inertia member hub portion and pressing against said cluch member for normally retaining said balls in the deep portions of their sockets, and friction means on the exterior surface of said frame member end wall opposite said clutch member, said inertia member acting, upon the acceleration of the strap outwardly of said frame member beyond a predetermined rate determined by the force of said calibrating spring to effect rolling of said balls within said tapered sockets while moving along said inertia member elongated slots to cause movement of said clutch member against the pressure of said calibrating spring and away from said flange, effecting the binding of said clutch member against said friction means on the exterior of said frame member end wall, thus stopping the turning of said spool with respect to said frame member, to thereby limit outward movement of the strap and retaining the user in his seat.

2. A safety harness device as defined in claim 1 comprising a compression spring within said frame member and interposed between said end wall and said spool for urging said spool away from said end wall, said spool having an annular boss facing said end wall, excessive pull by said strap upon said spool during a locking operation causing said balls to ride higher in their tapered sockets and force said spool endwise bodily against said end wall, whereby said boss binds against the inner surface of said end wall to further aid in locking said spool against payout of said strap.

3. A safety harness device as defined in claim 1 wherein stop means is provided on said inertia member engaging said clutch member for preventing relative turning of these members, said inertia member web apertures extending annularly sufficiently to permit limited annular movement of said balls about the central axis of said inertia member to allow said inertia member while holding said clutch member to work through an appreciable distance in effecting the locking operation, thereby enabling a relatively light inertia member to effect the locking operation.

References Cited

UNITED STATES PATENTS

| 3,058,687 | 10/1962 | Bentley | 242—107.4 |
| 3,202,379 | 8/1965 | Wrighton et al. | 242—107.4 |
| 3,335,974 | 8/1967 | Glauser et al. | 242—107.4 |
| 3,343,763 | 9/1967 | Spouge | 242—107.4 |

WILLIAM S. BURDEN, *Primary Examiner.*